(12) United States Patent
Keith et al.

(10) Patent No.: US 7,584,547 B2
(45) Date of Patent: Sep. 8, 2009

(54) FLUID LEVEL MEASURING GAUGE

(75) Inventors: Donald E. Keith, Mapleton, IL (US);
David S. Suckow, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 287 days.

(21) Appl. No.: 11/821,317

(22) Filed: Jun. 22, 2007

(65) Prior Publication Data
US 2008/0314141 A1 Dec. 25, 2008

(51) Int. Cl.
*G01B 3/00* (2006.01)
(52) U.S. Cl. ........................................... 33/722
(58) Field of Classification Search ............... 73/290 R; 33/722
See application file for complete search history.

(56) References Cited

U.S. PATENT DOCUMENTS

| 3,488,855 A | 1/1970 | Howe |
| 3,991,476 A | 11/1976 | Haines |
| 4,021,924 A * | 5/1977 | Haines ........................ 33/726 |
| 4,330,940 A | 5/1982 | Leitgeb |
| 5,485,681 A | 1/1996 | Hitchcock |
| 7,191,542 B2 | 3/2007 | Oyama et al. |

FOREIGN PATENT DOCUMENTS

| CA | 1115946 | 1/1982 |
| EP | 547384 A1 * | 6/1993 |

* cited by examiner

*Primary Examiner*—Hezron Williams
*Assistant Examiner*—Nathaniel Kolb
(74) *Attorney, Agent, or Firm*—Jandá Carter

(57) ABSTRACT

A fluid level measuring gauge for accurately measuring and reading a fluid level in a fluid level access chamber having one or more bends and interior chamfered shoulder zones, the fluid level measuring gauge including an elongate blade having an upper and lower portion where the upper and lower portions of the fluid level measuring gauge are in a constant twist formation for creating a nonwiping motion during insertion of the fluid level measuring gauge into and out of a fluid gauge access chamber, a flat shaped measuring region, including an upper port and a lower port in an up and down direction on the measuring region, a handle attached to the blade for controlled insertion and removal of the fluid level measuring gauge, and a spherical chamfer advancing guide affixed to the leading end of the elongate blade, opposite the handle.

7 Claims, 4 Drawing Sheets

FLUID LEVEL MEASURING GAUGE

TECHNICAL FIELD

This disclosure relates to a fluid level measuring gauge generally, and more particularly to a fluid level measuring gauge for accurately measuring and reading a fluid level in a fluid level access chamber having one or more bends or interior chamfered shoulder zones.

BACKGROUND

As is well known, vehicles and machines require some means for measuring the amount of fluid in their system tanks. In virtually all off-highway machine and vehicle applications, the simplest, and probably the most well-known, measuring means is the common dipstick or fluid level measuring gauge. Generally, an elongated fluid level access chamber or tube is provided which is in communication with the interior of the fluid reservoir. The access chamber is of course, adapted to receive and retain the fluid level measuring gauge until such time as it is removed for measuring purposes.

The typical gauge includes an elongated, usually flat, flexible member which extends through the chamber and into the reservoir. The end of the gauge is provided with suitable fluid level measuring indicia so that when the gauge is removed from the access chamber, the amount by which the fluid falls short of being full can be determined.

In the past, the access chamber has been straight or, at most, has included a relatively slight, simple bend. However, current designs in the past few years, particularly in off-highway machines, have become increasingly more curved and convoluted, due to the limited hardware real estate under the hood or within the housing area. Due to the size of the transmission or engine compartment, the size of the transmission or engine itself, and the large number of accessories that have been added to those assemblies, engineers have found it increasingly difficult to locate the access chamber. As a result, the chamber of current off-highway machines, petroleum transmissions, and vehicles oftentimes have a number of bends, one or more of which may be compound bends. As referred to herein, a compound bend is one in which an angular change occurs in more than one plane. Additionally, such access chambers may include two or more consecutive bends which lie in different planes. Such irregularly-shaped access chambers make it exceedingly difficult to insert, remove, and accurately read a flat, straight gauge. Yet further, the access chamber may have a changing inner diameter (ID) or one or more chamfered shoulder zones, further increasing the difficulty of inserting and accurately utilizing the fluid level gauge.

With regard to fluid level gauges with a flat blade, the problem arises as a result of the resistance of the gauge to bending motion in the plane parallel to its flat surface. When a bend in the access chamber requires that the gauge bend in this plane, the leading end of the gauge tends to engage and drag along the wall of the access chamber thus hindering passage of the gauge through the chamber and preventing an accurate read. In other words, the end of the gauge jams against the sides of the chamber in the vicinity of bends, thus inhibiting or preventing free movement of the gauge through the chamber. This problem is also encountered in gauges having round cross sections since once the gauge has been curved in one plane, it resists bending in other planes.

It has been contemplated to provide a gauge with a curved or twisted blade as seen in U.S. Pat. No. 7,191,542 issued to Oyama et al. While the gauge has a twisted shape provided on purpose to continue to a front edge of the measuring section, and where the twisted portion continuously twists from a tip of the gauge to a curved portion, it fails to have a continuously twisted blade section below and above a substantially flat measuring section therebetween. The Oyama patent does not suggest, teach or disclose the multiple twisted sections, each at approximately 180 degree angles, providing flexibility for enhanced gauge travel through the convoluted access chambers, especially at the end where the focus is primarily only on the measuring section.

Further, U.S. Pat. No. 4,021,924 issued to Haines attempts to overcome another problem described above by providing a friction reducing means comprising a roller member mounted so that it rotates in a plane, which is substantially parallel to the plane of the measuring member. The Haines patent suffers from at least one deficiency in that the friction reducing member is made of numerous separate parts riveted together which add to assembly time and manufacturing costs. Additionally, Haines teaches the use of separable parts that may easily wear (roller bearings, rivets, etc.), increasing the likely hood of failure after frictional encounters during assertion and removal of the gauge. Yet further, Haines does not teach, suggest, or contemplate having a twisted zone, with at least one complete 360 degree twist, located immediately adjacent to a spherical chamfer advancing guide.

Further, the prior art does not contemplate nor address the problems associated with easily, accurately, and inexpensively reading the fluid levels when the fluid is cleaner and thus a more clear and transparent color.

Up to this point, little or no sucessful developments have been claimed to alleviate the above-described combination of problems associated with fluid measuring devices, especially with regard to the high powered transmissions of the petroleum and agricultural off-highway machines or engines. Accordingly, the instant disclosure provides a novel combination of a lower cost, highly effective fluid level measuring gauge for accurately measuring fluid levels in a fluid level chamber having one or bends and interior chamfered shoulder zones.

SUMMARY

The present disclosure, in one form, provides a fluid level measuring gauge for accurately measuring and reading a fluid level in a fluid level access chamber having one or more bends or interior chamfered shoulder zones. The fluid level measuring gauge includes an elongate blade having an upper zone and lower zone where the upper and lower zones of the measuring gauge are in a constant spiral formation for creating a nonwiping motion during insertion of the fluid level measuring gauge into and out of a fluid gauge access chamber. It also includes a flat shaped measuring region, including a plurality of viewing ports aligned in an up and down direction on the measuring region, a handle attached to the blade for controlled insertion and removal of the fluid level measuring gauge, and a spherical chamfer advancing guide affixed to the leading end of the elongate blade, opposite the handle.

Other advantages and novel features of the present disclosure will become apparent from the following detailed description of the disclosure when considered in conjunction with the accompanying drawings.

DETAILED DESCRIPTION

Figure 1:
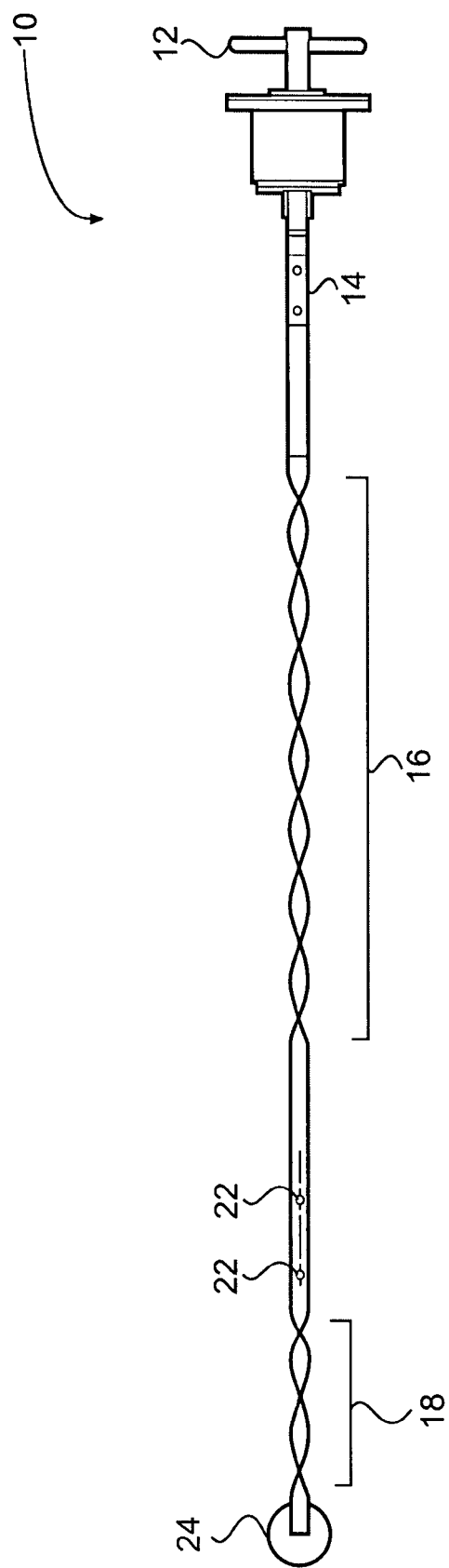
FIG. 1 is a top view illustration of an exemplary embodiment of the present disclosure.

Referring now to the drawings wherein the showings are for the purpose of illustrating the preferred embodiments of the disclosure only, and not for the purpose of limiting the same, FIG. 1 illustrates a fluid level gauge 10 having a plurality of continuously twisted blade zones, and a flat measuring region 17 between the twisted zones. In one embodiment, there are two continuously twisted blade zones: an upper zone 16 and a lower zone 18.

The continuously twisted zones 16, 18 are formed in a longitudinal spiral formation, with each twist forming a continuous approximate 180 degree turn from each other. The twisted zones 16, 18 give multi-directional freedom of movement for the gauge 10. The twisted zones may optionally be of differing lengths, with the lower zone sized to optimally include at least one complete 360 degree twist.

The overall length of the fluid measuring gauge 10 is appropriately sized for the particular application and length of the access chamber; and the upper zone 16 may be significantly longer in longitudinal length than the lower zone 18, as dictated by the overall length and number of bends of the access chamber. It is these bends and other advanced technology related enhancements of the standard straight access tubes or chambers of the past requiring gauges to incorporate means for flexible insertion. The present disclosure addresses the issues further, with a spherical chamfer advancing guide 24, affixed to the end of the fluid measuring gauge 10, opposite the handle 12. The spherical chamfer advancing guide 24 is fixedly attached to the distal end of the lower portion of the fluid level gauge 10. The guide 24 may be in the shape of a ball (or any other simply yet effectively manufactured shape for superiorly advancing a gauge regardless of the angle of insertion). The spherical chamfer advancing guide 24 has a width greater than the width of the measuring gauge 10 and appropriately less than the smallest width of the access chamber 30 for decreased friction through the one or more bends and for advancing past the chamfered inner diameter sections. By way of example only, the overall width of the flat measuring region 17 may be 5 to 10 mm, or larger or smaller for a particular application.

The spherical chamfer advancing guide 24, unlike known curved ended or twist ended gauges or essentially flat, roller ball friction reducing guides, will allow free passage of the fluid level measuring gauge 10 no matter how the gauge 10 is rotated or at which angle it encounters a bend or chamfered shoulder area. For the curved ended gauge to work, the radial curved area must hit the bend or chamfer parallel to the shoulder. The spherical chamfer advancing guide 24 however, will work no matter at which angle the gauge 10 is in when it makes contact, as would be understood by those skilled in the art.

Figure 2:
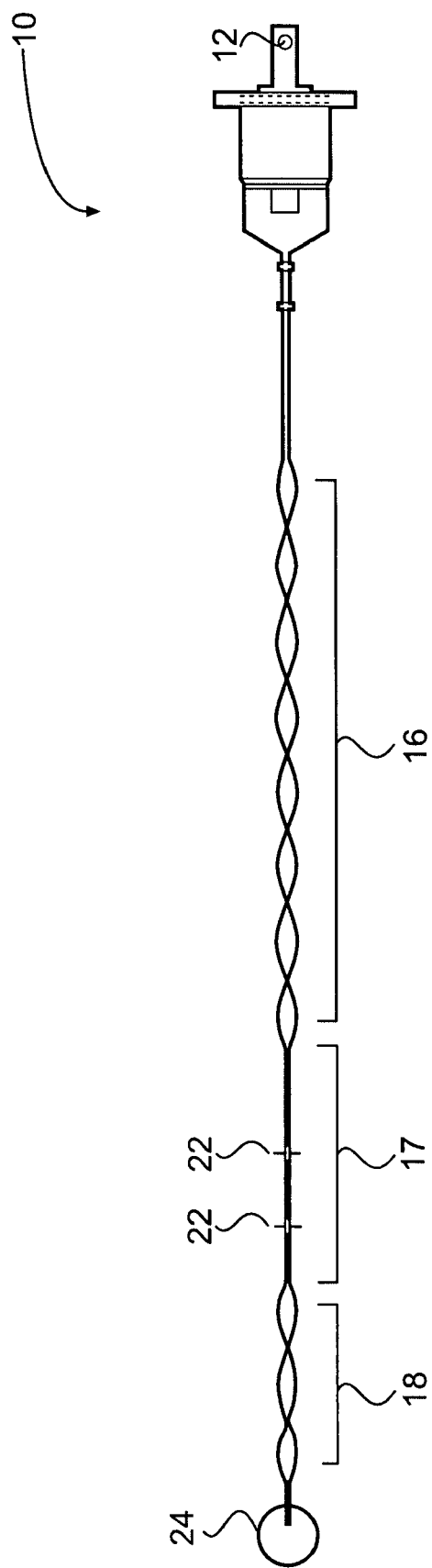
FIG. 2 is a side view illustration of an exemplary embodiment of the present disclosure.

FIGS. 1 and 2 further show the spherical chamfer advancing guide 24 rigidly attached to one end of the gauge 10 by a heated welding procedure. As would be understood, this welding method may include frictional welding, where the spherical guide 24 would be moved to abut to a longitudinal end of the rod and an external force applied between the guide 24 and the blade end so that heat is generated by friction at the abutment, or any other appropriate welding. The frictional heat welds the spherical chamfer advancing guide 24 to the blade, and bulges (not shown) are usually formed at which the spherical guide 24 is firmly connected to the end of the blade. Means for affixing the guide 24 to the blade is not limited to frictional welding, and any other equivalent techniques such as arc, bevel or fusion welding can be employed. Additionally, the lower twisted zone may be located and incorporated in a section immediately adjacent the spherical chamfer advancing guide 24 to optimally allow synergistic effects to make the guide even more effective, especially during insertion, due to the increased flexibility at the leading edge.

Again turning to FIGS. 1 and 2, a plurality of integrated ports 22 for viewing fluid level or fluid conditions is shown. It is important to be able to accurately read the level of fluid in the particular reservoir. The integrated ports 22 allow the fluid to form a coherent film over the openings of the ports and the excess material to drip back into the reservoir (not shown). The coherent and cohesive film will form over the ports as long as the fluid level is at the correct operating levels, and will not when it is time to replenish the fluid. Further, the ports 22 allow for viewing even when the fluid color is clean and transparent, as may be with high-powered oils or other fluids. Additionally, the film formed over the ports 22 during fluid measuring may give other indications of fluid quality, as the ports 22 provide a virtual window into the reservoir of the transmission or other machine or vehicle component.

The ports 22 are located and aligned at such a level within the reservoir to communicate fluid level conditions. Further, fluid level measurement indicia or markings for "full" or "low" level fluid conditions may be indicated graphically on the measuring region of the gauge 10, with "low" indicating that the fluid level has fallen below a predetermined desired level. There are marks at the lower end of the dipstick, intended to indicate the minimum and maximum fluid level in the fluid reservoir compartment.

The ports 22 may be manufactured into the fluid level measuring gauge 10 via stamping during the original formation of the blade portion. The ports 22 may optionally be formed via shot blasting, drilling, or any other appropriate means.

Figures 3A, 3B:
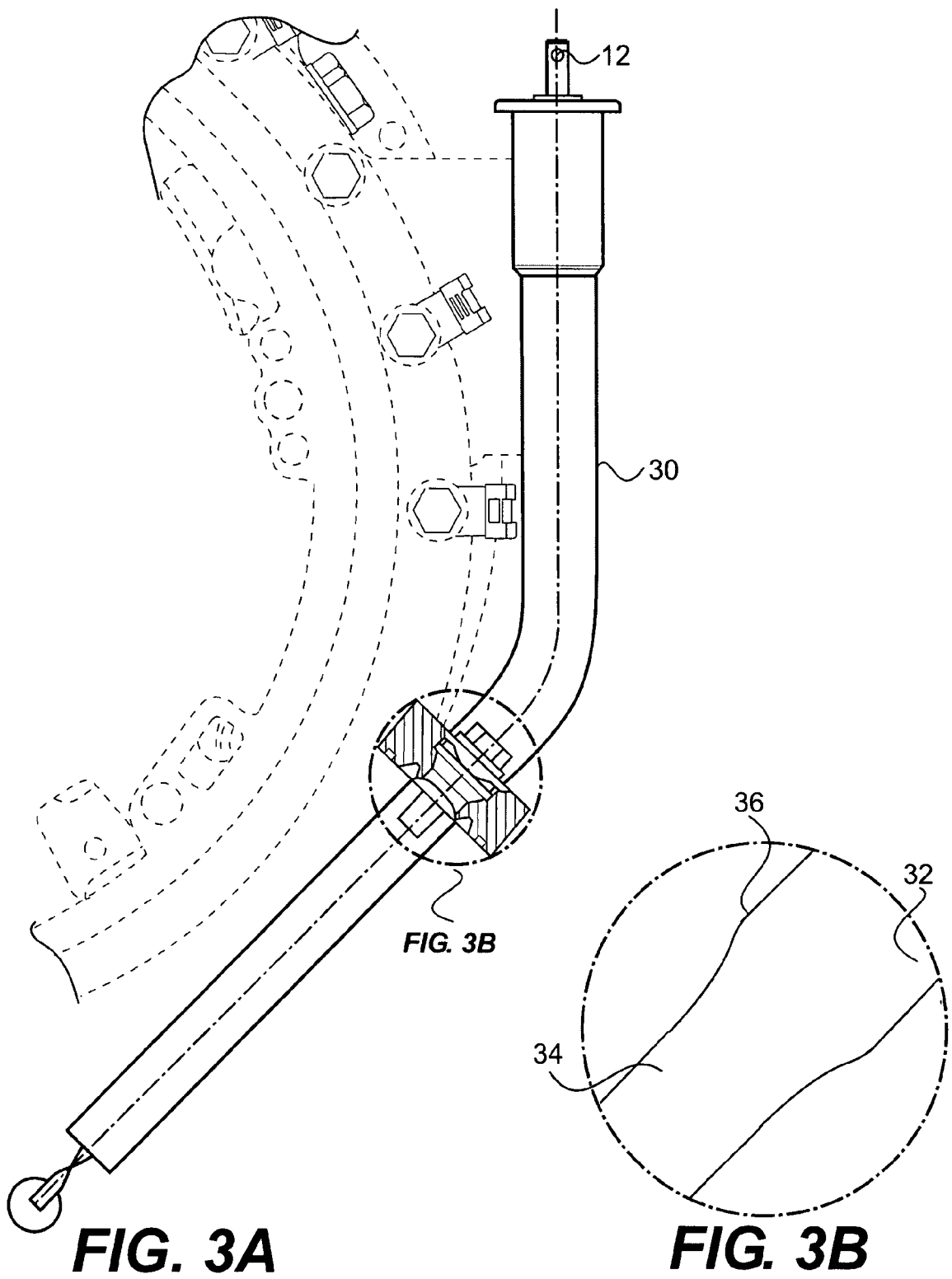
FIG. 3A is a side view illustration of a fluid level access chamber of the present disclosure.
FIG. 3B is an exploded view of a chamfered shoulder section of a fluid level access chamber of the present disclosure.
Figure 4:
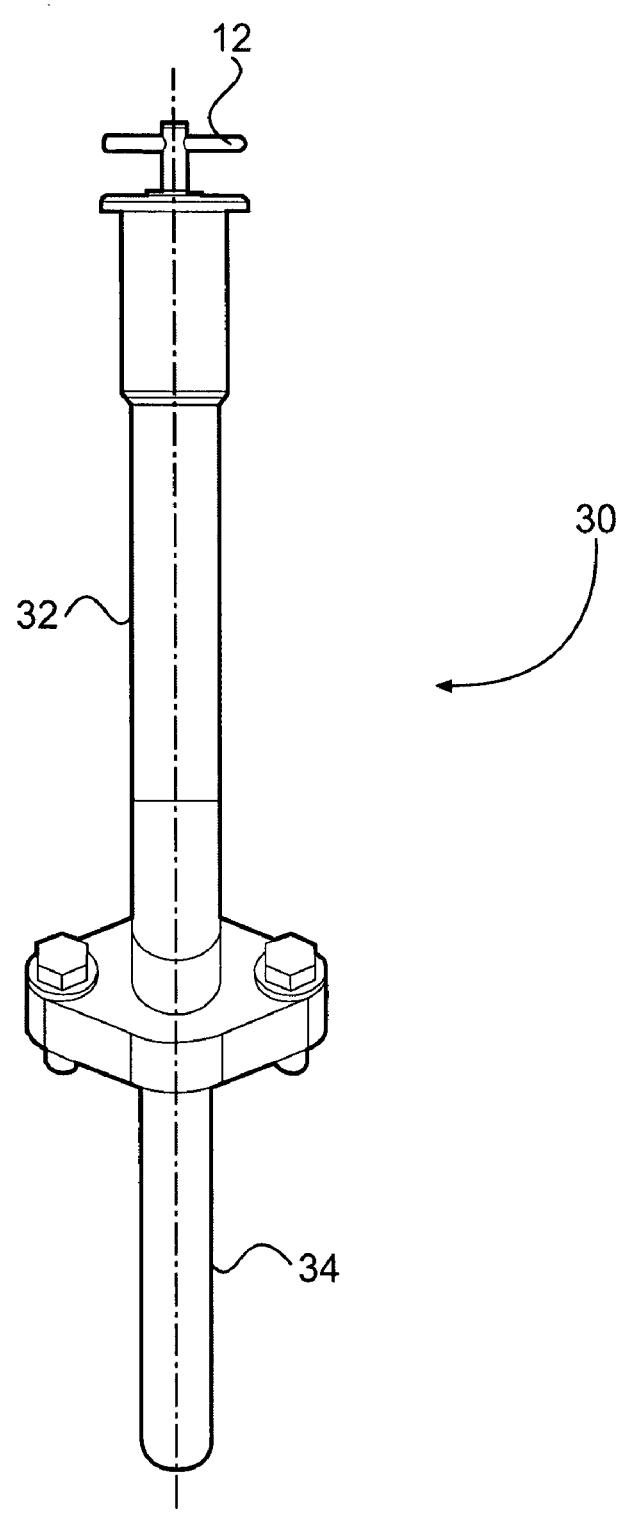
FIG. 4 is a side view illustration of an exemplary embodiment of the present disclosure.

An exemplary access chamber 30 for a fluid level measuring guide is illustrated in FIG. 3. The access chamber 30 is adapted to receive a fluid level measuring gauge 10 which extends through the chamber and into the transmission reservoir. The access chamber 30 includes one or more bends 32, and may also include chamfered shoulder areas 34. An exploded view of an exemplary chamfered shoulder area 34, as exemplified in FIG. 4, may occur due to binding or restrictions caused by the bends 32. Or this area 34 may be caused by a required reduction in diameter of the access chamber 30 as the chamber 30 surrounds the transmission or engine for accessibility reasons, or due to the required method (i.e., bolting, bracketing, etc) for locating and orienting the chamber 30.

The gauge 10 may be made from flat spring gauge steel, but could of course be made of a plastic or nylon, or any other material that would less prone to heat damage and deterioration withstand the required temperature limits and have compatibility with the fluids for which it would be used. As used herein, flat means a member having little depth or thickness, that is, a member, which is relatively broad and thin in its transverse dimensions. The gauge 10 may, for example, have a thickness less than 1.0 mm, or any other thickness to appropriately flex and bend along the path of the fluid level access chamber 30 and withstand the conditions imposed from the machine transmission or engine.

In additional to the configuration described above, an exemplary embodiment may additionally incorporate the following features as shown in FIGS. 1 and 2. A T-shaped handle or holding bar 12 may be integrally provided at the top end of the gauge 10, opposite the spherical chamfer advancing guide 24.

INDUSTRIAL APPLICABILITY

The industrial applicability of the fluid level measuring gauge described herein will be readily appreciated from the foregoing discussion. A gauge 10 is described wherein accurate measurement of fluids within a petroleum transmission or other vehicle or machine component is described.

In the fluid level measuring gauge according to the embodiments of the disclosure, the majority of the length in the longitudinal direction is twisted. Therefore, even when the fluid level measuring gauge 10 is pulled out of an access chamber 30 with convoluted and interior chamfered shoulder areas regions, an accurate reading may still be obtained.

Examples of the present disclosure are applicable to any fluid measuring gauge for use in a complex fluid level access chamber employing at least one curve or bend and possibly a chamfered shoulder region within the inner chamber. In such gauges, use of the foregoing fluid level gauge can provide better measuring results and easier accessibility.

It will be appreciated that the foregoing description provides examples of the disclosed gauge. However, it is contemplated that other implementations of the disclosure may differ in detail from the foregoing examples, as would occur to those skilled in the art. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely, unless otherwise indicated.

Recitation of ranges of values or dimensions herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A fluid level measuring gauge for accurately measuring and reading a fluid level in a fluid gauge access chamber having one or more bends or interior chamfered shoulder zones, said fluid level measuring gauge comprising: an elongate blade having an upper zone and lower zone wherein said upper and lower zones of said measuring gauge are in a constant spiral formation for creating a nonwiping motion during insertion of said fluid level measuring gauge into and out of a fluid gauge access chamber; a flat shaped measuring region, including a plurality of ports aligned in an up and down direction on said measuring region; a handle attached to said blade for controlled insertion and removal of said fluid level measuring gauge; and a spherical chamfer advancing guide affixed to the leading end of said elongate blade opposite said handle.

2. The gauge of claim 1, wherein said measuring region is located between said upper and lower zones.

3. The gauge of claim 1, wherein said lower zone includes at least one complete 360 degree twist.

4. The gauge of claim 3, wherein said lower zone is located immediately adjacent to said spherical chamfer advancing guide.

5. The gauge of claim 1, wherein the constant spirals are at approximate 180 degrees of each other.

6. The gauge of claim 1, wherein the spherical chamfer advancing guide is welded to end of said gauge.

7. The gauge of claim 1, wherein two ports are oriented adjacent fluid level measuring indicia.

* * * * *